United States Patent Office 2,923,316
Patented Feb. 2, 1960

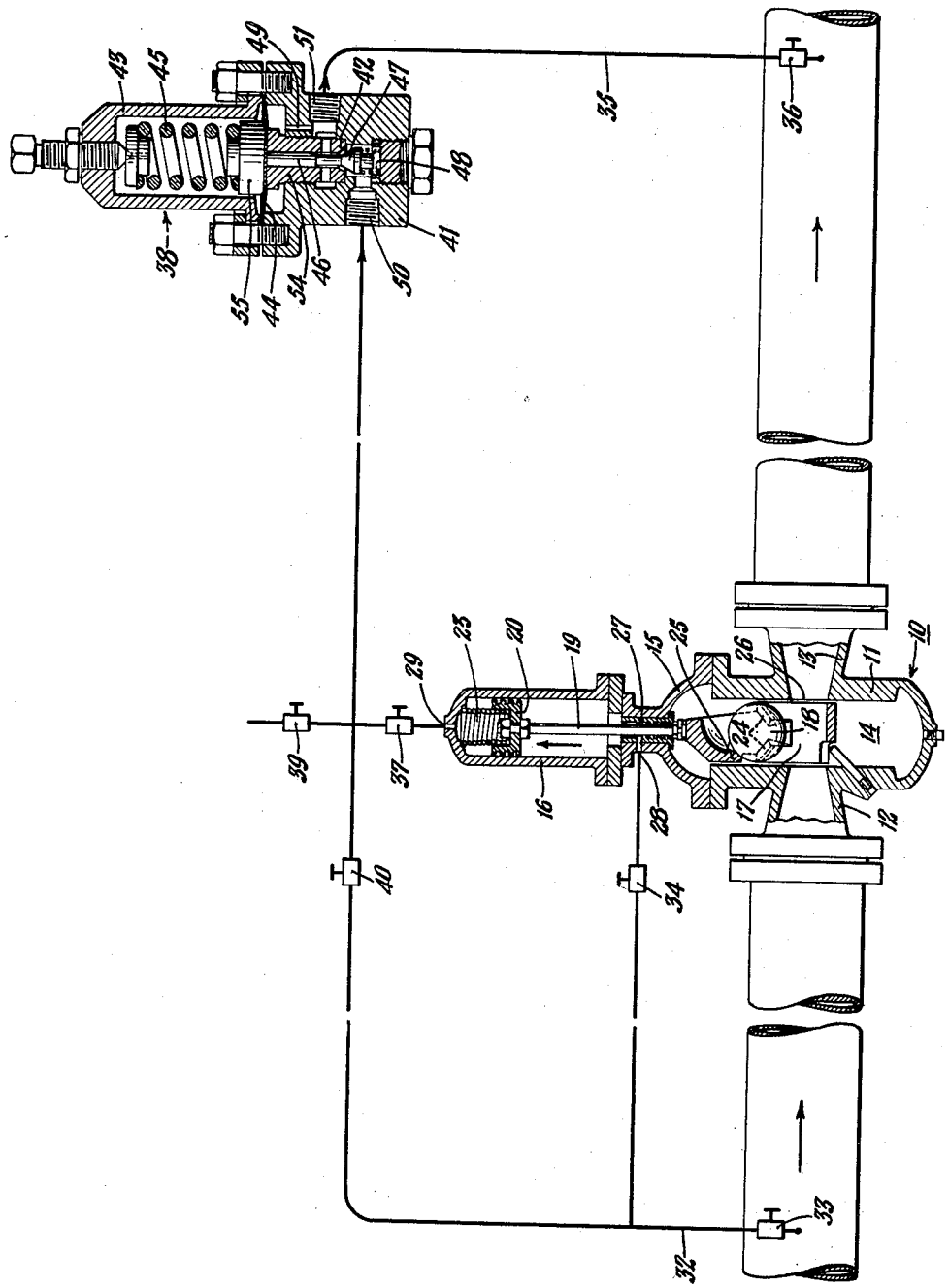
INVENTORS
HERMAN L. PAUL, JR.
BY RUEL E. TAYLOR, JR.
Harold P. Wilhelm
ATTORNEY

2,923,316

REGULATING VALVE

Herman L. Paul, Jr., Packanack Lake, N.J., and Ruel E. Taylor, Jr., South Windham, Maine, assignors to Paul Valve Corporation, New York, N.Y., a corporation of New Jersey Application September 21, 1953, Serial No. 381,447

5 Claims. (Cl. 137—489.3)

The invention relates to valves for controlling fluid flow, and more particularly to valves, sometimes referred to as regulating valves, for automatically controlling fluid flow, under government by some desired stimulus.

The invention, in its preferred form, contemplates the use, as the main control valve, of a ball valve, as disclosed, for example, in U.S. Patent No. 2,629,578, granted to the present assignee on February 24, 1953, on application filed in the name of Herman L. Paul, Jr. According to a preferred form of the present invention, the spindle of this valve is connected to a piston fitting loosely within a control cylinder. It is preferred that the axis of the control cylinder be vertically disposed for sensitivity of operation; but the invention contemplates placing the control cylinder axis in other positions. The cylinder has suitable ports to which governing fluid pressure may be applied. Various control piping systems may be provided for connecting these ports to various pressure points, depending upon the nature of particular system whose fluid flow the main control valve is to govern. In the present case, the piping is connected to regulate pressure on the downstream side of the main valve.

The control or throttling orifice of such a ball valve, as referred to above, is determined by a ball rolling out of its seat. Because of this particular relationship, the valve is especially free moving; in the preferred form, the loose fit of the piston in the control cylinder provides, in effect, a fluid bearing on all lateral walls; all slidable parts being substantially vertical, the valve assembly is substantially full floating and friction free.

Objects of the invention are to provide an improved regulating valve system.

Referring to the drawing, the single figure represents a regulating valve system for liquid according to the invention, utilizing a pilot valve. The main pipe or conduit carrying the fluid through the main ball type valve is shown as conventional fluid conduit; in contrast, the regulating or control piping is shown as a single line. Here the system is used to keep downstream pressure constant, even though volume and upstream pressure may vary widely.

The main valve 10 comprises a casing 11 having a tapered inlet 12 and a tapered outlet 13 intersected by a vertical recess 14. The casing is closed by a bonnet 15 to which is attached control cylinder 16.

Within recess 14 is a cage 17 carrying ball 18. The cage is connected to a stem 19 which is connected to loose piston 20 working in cylinder 16. Loose piston 20 has labyrinth sealing. Spring 23 acts between the head of the cylinder and the piston 20 to urge the latter downwardly.

Cage 17 has opening wedges 24 on either side of the ball 18 to lift the ball off its seat when fluid pressure is holding the ball against its seat; cage 17 also has a locking wedge 25 to hold the ball against its seat.

It will be noted that, as the piston 20 moves downwardly, the cage 17 moves the ball 18 downwardly, causing the ball, first, partially to obstruct the main flow passage through the valve and finally to seat on the seat 26.

The valve stem 19 passes loosely through a bushing 27 having a labyrinth seal. Bonnet 15 has an opening 28 above the labyrinth seal, and top of cylinder 16 has an opening 29 for connection to control piping hereinafter discussed more in detail.

For a more complete disclosure of the main control valve 10, attention is called to the above-mentioned Paul patent.

Instead of the loose fit and labyrinth seal to provide a leakage path around the control piston 20, small leakage holes (not shown) may be provided in the piston. However, it is preferred to have a loose fit between piston and cylinder wall to promote ease of movement. In fact, the fit may be so loose that the piston may be said to "float" on the upward flow of leakage or control fluid. The labyrinth sealing provides loose fit and yet retards fluid flow. By varying the depth, size and number of grooves, the leakage quantity may be set to meet the requirements of any given installation.

The control piping includes an inlet pipe 32 having stop valve 33 and variable orifice valve 34, said piping being connected to opening 28. The piping also includes an outlet pipe 35 connected from opening 29 to the downstream side of the main line and incorporating stop valves 36 and 37, and a pressure reducing pilot valve 38. A vent valve 39 is also provided. Variable orifice valve 40 is also provided in a part of the control piping bypassing cylinder 16.

The variable orifice valve 34 is for the purpose of supplementing flow through the labyrinth seal at bushing 27 where the spindle 19 passes through the bonnet 15, thus compensating for manufacturing variations in different control valves and adjusting the speed with which pressure differential to open the control valve 10 is created under loose piston 20. This variable orifice valve 34 may be eliminated if leakage at 27 is substantially greater than leakage around the loose piston 20.

The stop valves 33 and 36 are for the purpose of shutting off fluid flow when the system is shut down. Vent valve 39 provides for venting control valve 10 and pilot piping of gas and air, if necessary when the fluid, which the main valve 10 controls, is a liquid; provides means of testing relation between leakage past loose piston 20 and capacity of pilot reducing valve 38 and provides auxiliary means of emergency operation should failure of pilot valve 38 occur.

The control piping 32, 35 should be connected to the main line a sufficiently large distance from the main throttle valve 10 to obtain uniform pressure conditions, unaffected by the considerable pressure change that takes place in the venturi 12, 13 of the main valve 10. The connections should preferably be at points midway the height of the horizontal main line, as shown.

The pilot valve 38 is a standard pressure reducing valve as illustrated. It comprises a casing 41 in which is positioned a bushing 54 having a seat 42. Slidably mounted in the bushing is a valve stem 46 carrying a valve disc 47. A control chamber 43 houses a spring 45 which presses a plate 55 against a flexible diaphragm 44 whose downward movement is limited by the bushing 54. A spring 48 urges valve stem 46 up against the diaphragm 44. The valve casing has an inlet 50 and outlet 51, the flow through the valve being in the direction of the arrows. A passage 49 connects with outlet 51 and with chamber below the diaphragm for the purpose of communicating downstream pressure to the diaphragm 44.

The operation of the regulating system will now be described. Assuming an upstream pressure of 1000 pounds and a nominal downstream pressure of 100 pounds, control fluid will flow through inlet piping 32, and through bushing 27, to the lower side of loose piston 20. It will leak past the piston 20 and flow through outlet piping 35 and through the pilot valve 38 (when open) to the downstream side of the main valve 10.

Assume the downstream pressure increases. This will increase pressure on the diaphragm 44 of the pilot valve 38, causing it to move toward closed position. This reduces control fluid flow through piping 32 and 35 and reduces pressure drop across loose piston 20. At such lower pressure drop, the action of the spring 23, of the Bernoulli pressure difference upon the valve ball 18, of the force created by the flow against the ball, and, if the main valve is in a vertical position, by the weight of the parts, all combine to close main valve sufficiently to reduce flow therethrough and thus reduce pressure on the downstream side thereof to the assumed "set" pressure of 100 p.s.i.

Assume now that downstream pressure decreases from the nominal 100 pounds. This decreases pressure on the diaphragm of the pilot valve 38, causing it to move toward full open position. This increases control fluid flow through piping 32 and 35 and increases the pressure drop across loose piston 20. This pushes the piston upwardly against spring 23 to open the main valve 10 sufficiently to increase main fluid flow therethrough and thus increase pressure on the downstream side to the assumed nominal pressure of 100 pounds.

As in the design of this valve assembly, valve body and bonnet pressure are communicated directly to the cylinder under the loose piston 20 and since, as the main control valve 10 closes or opens, there is a tendency for this pressure to increase or decrease, there is an inherent dampening of destructive oscillation by the slowing down of the rate of closing or opening as the control valve 10 approaches its fully closed or fully opened positions.

When there is no demand downstream, the pilot 38 will close due to the increased pressure and the main valve 10 will close because the pressure will balance on both sides of the loose piston 20, causing the parts of main valve 10 to drop due to gravity and to the spring 23.

Although the regulating system according to the invention may be used with different types of main valve, the valve described in the above-mentioned U.S. patent is especially well adapted for this purpose. This is for the reason that comparatively little force is required to move the valve from full closed to full open position; also because of the inherent straight line operation.

In this type of valve the rate of fluid flow through the valve is substantially directly proportional to the amount of longitudinal displacement of the actuator or cage from closed position. This follows from the nature of the opening caused by a ball rolling out of a circular seat; it is made possible in this valve by locating all parts of the cage 17 out of the throat of the venturi 12, 13 so that the only impedance to the fluid flow through the valve during throttling is caused by the ball itself.

The raising of the ball from its seat takes only a minimum amount of force because of the efficiency of the opening wedges 24. Once the ball is cracked off its seat, the main fluid flow causes very little resistance to displacing forces on the cage by loose piston 20.

The capacity of the pilot valve 38 should be greater than the combined capacity of the loose piston "blow-by" and its bypass through valve 40. Thus, when the pilot valve 38 is fully open, the pressure across the loose piston 20 is determined solely by the difference between the upstream pressure and the downstream pressure and by the position of the bypass valve 40. The wider the bypass valve 40 is open, the less the pressure across the loose piston 20. The rapidity of response of the main valve to the opening signal may be adjusted by varying the capacity of variable orifice valve 40 so that some of the flow through 40 and leakage around the leaky piston is varied in relation to pilot valve capacity.

When the pilot valve 38 is open, it influences the pressure drop across the loose piston 20. When the pilot valve is completely closed, pressure across the loose piston equalizes, and the main regulating valve 10 closes due to the action of its spring and the weight of its movable assembly.

When the pilot valve 38 is only partly open, only a small pressure drop may occur across the loose piston 20 because most of the pressure drop occurs across the pilot valve. If the spring 23 of the main valve 10 and other parts are adjusted to respond to small pressure difference, the main valve 10 may be made to respond to small changes in pilot valve opening.

The use of a special pilot pressure-reducing valve in the control fluid line has special advantages. The pilot valve limits the variation in control fluid flow to correspond to the allowable variation in downstream pressure. For example, if it is desired to keep the downstream fluid pressure at, nominally, 100 pounds, the pressure may actually vary between 99 pound and 101 pound limits, to cause the regulating action. At 99 pounds, the pilot valve 38 should be wide open; at 101 pounds, the pilot valve 38 should be completely closed.

This is the well known regulating action of all governors which operate between set limits. Thus the regulating action of the main regulating valve can be made to respond to a small pressure difference of, say, 2 pounds in downstream pressure, even though the leakage flow through the control piping is caused by the prime differential of the system, between, say, 1000 pounds, on the upstream side of the main valve, and 100 pounds on the downstream side of the main valve.

With any pilot valve setting, greater sensitivity occurs with the bypass valve 40 closed. Opening the bypass valve 40 decreases the pressure drop across the loose piston 20.

The pilot valve 38 has a larger capacity than the control fluid flow necessary to operate the main regulating valve 10. The action of the pilot valve permits maintaining a steadier downstream pressure even though the upstream pressure should vary somewhat. In actual practice, the upstream pressure may vary widely—in some cases from 1000 pounds to 160 pounds.

It will be noted that the movable parts in the main regulating valve may be said to be "full floating." That is to say, the valve is vertically disposed; the weight of all moving parts is substantially balanced by fluid pressure; the resistance to movement is substantially zero because there is no stuffing box, no piston rings (and consequently no binding), and because the sliding contact between all moving parts and the valve casing is essentially a fluid contact. Thus, small force is required to move the movable valve assembly throughout its entire range of throttling control.

It will be understood that at the very instant of opening, a larger force is necessary to move the ball off its seat but, having so moved the ball to the "crack open" position, this force diminishes at once to the small, steady amount required to move the parts over the entire range of opening and closing. Full regulation of flow is maintained over the entire range of movement from tight shut-off to wide open positions and vice versa.

Tight shut-off is obtained with Paul type of valve, as well as smooth control. This is in contrast to the conventional double seat, double disc type of valve which very rarely closes tightly in regulating systems.

It will be noted further that the main fluid flow through the main valve 10 interposes substantially no opening or closing force on the actuator throughout the entire range of regulating movement. That is to say, any tendency of the main fluid flow through the valve to close the valve when the ball is almost seated is fully compensated for. This compensation is obtained by the action of the opening wedges 24 operating between the ball and the seat margin being non-reversible. Thus the loose piston 20 is free to respond to variations in control fluid or leakage flow only.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a valve control system, a valve structure comprising a main throttle valve and a control cylinder, said throttle valve comprising a casing having a straight through flow passage and a transverse recess intersecting said flow passage, said casing having a valve seat surrounding said straight through flow passage, an actuator mounted in said recess and movable lengthwise thereof, a ball loosely mounted in said actuator, lengthwise movement of said actuator causing said ball to move relative to said seat to variably control fluid through the valve, said control cylinder being disposed with its axis in line with the length of said transverse recess, a structural member having a connecting passage connecting adjacent ends of said control cylinder and transverse recess, a control piston loosely mounted in said cylinder, a stem passing loosely through said connecting passage and connected to said piston and actuator, means providing a loosely fitting seal between said stem and the wall of said connecting passage, means for supplying leakage fluid at one end of said control cylinder, and means for withdrawing said leakage fluid from the other end of said control cylinder, whereby to control the position of said ball relative to said seat.

2. In a system according to claim 1, said supplying means including a control conduit connecting with a point in said valve structure on the side of said loosely fitting seal adjacent said control piston, said control conduit also connecting with a point of higher fluid pressure than fluid pressure on the side of said loosely fitting seal remote from said control piston.

3. In a system according to claim 1, a bypass conduit connecting points in the system at opposite ends of said control cylinder, means to control the fluid flow through said bypass conduit to vary the response of said control piston with change in operating conditions.

4. In a system according to claim 1, a relief conduit connected to one end of said control cylinder and to a point of reduced fluid pressure, manually operated means in said relief conduit which may be opened to open said throttle valve.

5. In a system according to claim 1, said actuator having a locking wedge, manually operated valve means for equalizing fluid pressure on opposite sides of said control piston to cause said locking wedge to engage said ball and hold it in said seat.

References Cited in the file of this patent

UNITED STATES PATENTS

| | | |
|---|---|---|
| 406,029 | Curtis | July 2, 1889 |
| 581,373 | Schmidt | Apr. 27, 1897 |
| 685,930 | Nethery | Nov. 5, 1901 |
| 925,812 | Jahn | June 22, 1909 |
| 1,084,940 | Jahn | Jan. 20, 1914 |
| 1,724,891 | Anderson | Aug. 20, 1929 |
| 2,158,068 | Grove | May 16, 1939 |
| 2,340,954 | Garretson | Feb. 8, 1944 |
| 2,629,578 | Paul | Feb. 24, 1953 |